(12) United States Patent
Tarayan et al.

(10) Patent No.: US 11,881,054 B2
(45) Date of Patent: Jan. 23, 2024

(54) DEVICE AND METHOD FOR DETERMINING IMAGE DATA OF THE EYES, EYE POSITIONS AND/OR A VIEWING DIRECTION OF A VEHICLE USER IN A VEHICLE

(71) Applicant: DAIMLER AG, Stuttgart (DE)

(72) Inventors: Emin Tarayan, Sindelfingen (DE);
Maria Hirsch, Stuttgart (DE);
Christoph Weckmann, Calw (DE);
Peter Schindewolf, Gomaringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/597,254

(22) PCT Filed: Jun. 25, 2020

(86) PCT No.: PCT/EP2020/067868
§ 371 (c)(1),
(2) Date: Dec. 30, 2021

(87) PCT Pub. No.: WO2021/001258
PCT Pub. Date: Jan. 7, 2021

(65) Prior Publication Data
US 2022/0319200 A1    Oct. 6, 2022

(30) Foreign Application Priority Data
Jul. 3, 2019    (DE) .................. 10 2019 004 692.7

(51) Int. Cl.
*G06V 40/18*    (2022.01)
*G06V 10/141*    (2022.01)
(Continued)

(52) U.S. Cl.
CPC .......... *G06V 40/193* (2022.01); *G06V 10/141* (2022.01); *G06V 20/597* (2022.01); *G06V 40/19* (2022.01); *G06V 2201/07* (2022.01)

(58) Field of Classification Search
CPC ...... G06V 40/193; G06V 40/19; G06V 40/18; G06V 10/141; G06V 20/597; G06V 2201/07
See application file for complete search history.

(56) References Cited

U.S. PATENT DOCUMENTS

| 8,090,496 B2 | 1/2012 | Matsuura et al. |
| 9,785,235 B2 | 10/2017 | Shigeta et al. |

(Continued)

FOREIGN PATENT DOCUMENTS

| CN | 101161200 A | * | 4/2008 | ............. A61B 3/113 |
| DE | 102005008566 A1 | * | 9/2005 | ............. B60K 35/00 |

(Continued)

OTHER PUBLICATIONS

International Search Report dated Oct. 1, 2020 in related/corresponding International Application No. PCT/EP2020/067868.

(Continued)

*Primary Examiner* — Michael Robert Cammarata
(74) *Attorney, Agent, or Firm* — PATENT PORTFOLIO BUILDERS PLLC

(57) ABSTRACT

A device includes a camera that detects image data of the head and eyes of the vehicle user. An image data evaluating unit determines, using the detected image data, positions of the eyes or the current viewing direction of the vehicle user. Control equipment generates a signal that activates a light source when the current positions of the eyes or the viewing direction is not determinable. The light source has one or more individual light sources arranged so that the one or more individual light sources can only be discerned by the (Continued)

Figure 1:
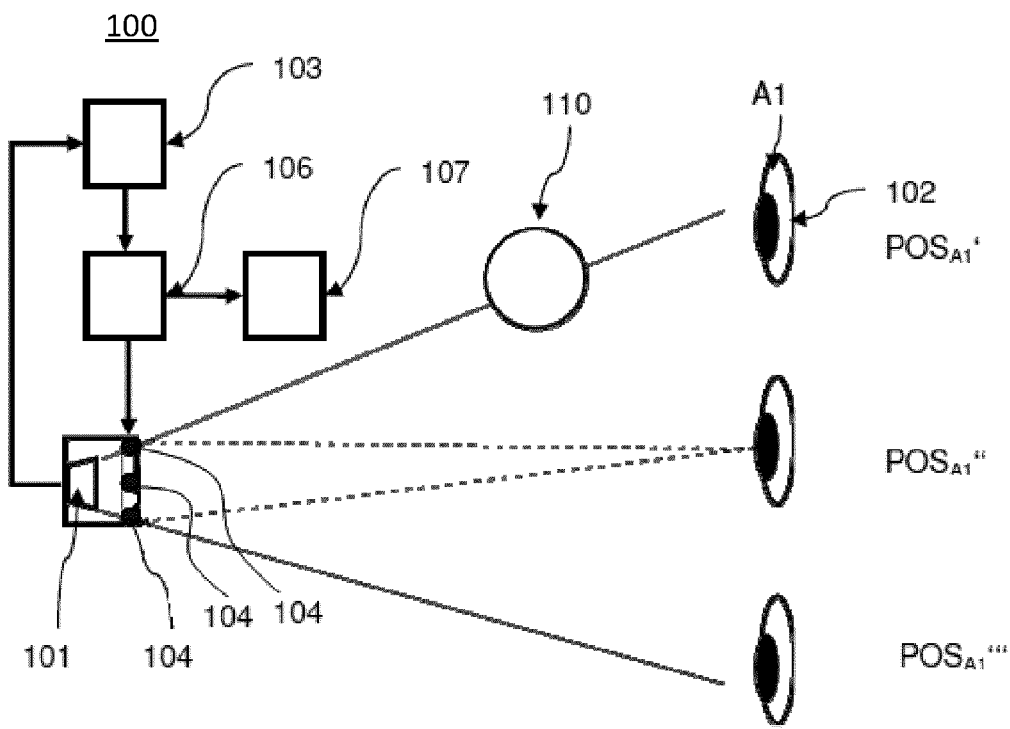

vehicle user or discerned simultaneously if the user's eyes, a vehicle user's eye positions and/or a current viewing direction of the vehicle user are clearly detectable.

13 Claims, 2 Drawing Sheets

(51) Int. Cl.
*G06V 20/59* (2022.01)
*G06V 40/19* (2022.01)

(56) References Cited

U.S. PATENT DOCUMENTS

| | | | | |
|---|---|---|---|---|
| 10,277,837 B2* | 4/2019 | Madau | | G08B 21/06 |
| 10,746,988 B2* | 8/2020 | Oshima | | B60K 35/00 |
| 10,776,644 B1* | 9/2020 | Zhang | | G08B 21/06 |
| 2013/0325264 A1* | 12/2013 | Alcazar | | B62D 1/181 |
| | | | | 701/49 |
| 2016/0001781 A1* | 1/2016 | Fung | | G07C 9/37 |
| | | | | 701/36 |
| 2016/0107574 A1* | 4/2016 | Voelkel | | H04N 7/183 |
| | | | | 348/148 |
| 2018/0099612 A1* | 4/2018 | Weller | | B60R 1/04 |
| 2018/0319407 A1* | 11/2018 | Lisseman | | B60W 50/14 |
| 2020/0104571 A1* | 4/2020 | Osuga | | B60R 21/01538 |
| 2020/0143189 A1* | 5/2020 | Shiota | | H04N 23/74 |
| 2020/0348751 A1* | 11/2020 | Beineke | | G06V 40/18 |
| 2021/0046862 A1* | 2/2021 | Wang | | G06V 20/58 |
| 2021/0394775 A1* | 12/2021 | Julian | | G08G 1/164 |
| 2022/0305910 A1* | 9/2022 | Buss | | G06F 3/012 |
| 2022/0319200 A1* | 10/2022 | Tarayan | | G06V 20/597 |

FOREIGN PATENT DOCUMENTS

| | | | | |
|---|---|---|---|---|
| DE | 102004014628 A1 * | 10/2005 | | B60K 35/00 |
| DE | 102005004511 A1 * | 8/2006 | | B60W 30/12 |
| DE | 102008036023 A1 | 2/2009 | | |
| DE | 102012010757 A1 * | 12/2012 | | B60Q 3/042 |
| DE | 102012005674 A1 * | 4/2013 | | B60K 15/03 |
| DE | 102014008808 A1 * | 11/2014 | | B60R 1/00 |
| DE | 102013020699 A1 * | 5/2015 | | B60K 37/06 |
| DE | 102014018397 A1 * | 6/2015 | | B60K 35/00 |
| DE | 102014203444 A1 | 8/2015 | | |
| DE | 102014221039 A1 * | 4/2016 | | B60R 1/00 |
| DE | 102014221039 A1 | 4/2016 | | |
| DE | 102015013081 A1 * | 4/2016 | | B60K 35/00 |
| DE | 102015016649 A1 * | 7/2016 | | B60K 35/00 |
| DE | 102016002289 A1 * | 8/2016 | | |
| DE | 102015207982 A1 | 11/2016 | | |
| DE | 112014006382 T5 | 11/2016 | | |
| DE | 102016005473 A1 * | 2/2017 | | |
| DE | 102016011141 A1 * | 4/2017 | | |
| DE | 102016012343 A1 * | 5/2017 | | |
| DE | 102017009515 A1 * | 3/2018 | | |
| DE | 102018004277 A1 | 10/2018 | | |
| DE | 102018004007 A1 * | 11/2018 | | |
| DE | 102017010866 A1 * | 5/2019 | | |
| DE | 102018213254 A1 * | 2/2020 | | |
| EP | 1767407 A1 | 3/2007 | | |
| EP | 1767407 A1 * | 3/2007 | | B60R 21/01532 |
| EP | 3249497 A1 | 11/2017 | | |
| GB | 2539467 A * | 12/2016 | | B60K 35/00 |
| JP | 2008227906 A * | 9/2008 | | |
| KR | 100921092 B1 * | 10/2009 | | |
| KR | 1020190050227 A | 5/2019 | | |
| WO | 2018208776 A1 | 11/2018 | | |

OTHER PUBLICATIONS

Office Action dated May 26, 2020 in related/corresponding DE Application No. 10 2019 004 692.7.

Written Opinion dated Oct. 1, 2020 in related/corresponding International Application No. PCT/EP2020/067868.

* cited by examiner

DEVICE AND METHOD FOR DETERMINING IMAGE DATA OF THE EYES, EYE POSITIONS AND/OR A VIEWING DIRECTION OF A VEHICLE USER IN A VEHICLE

BACKGROUND AND SUMMARY OF THE INVENTION

Exemplary embodiments of the invention relate to a device and a method for determining image data of the eyes, of the current positions $POS_{A1}$, $POS_{A2}$ of the two eyes A1, A2 of a vehicle user and/or of a current viewing direction of the vehicle user in a vehicle. Detection of the positions $POS_{A1}$, $POS_{A2}$ of the two eyes A1, A2 serves therein advantageously as a basis for determining a current viewing direction of the vehicle user.

Modern advanced driver-assistance systems have functions that can be controlled based on the determined current viewing direction of the vehicle user. Thus, in existing advanced driver-assistance systems and safety systems in motor vehicles, a large amount of data is used to make better setting and effectiveness of the systems possible. This also includes data from the interior of the motor vehicle, which may relate to the driver or other occupants.

Thus, for example, it is known to determine the viewing direction of a driver of a motor vehicle and use the relevant information in advanced driver-assistance systems. For determining this information, generally a video camera is used, which records the driver's head frontally from the front. For this purpose, the camera may, for example, be positioned in the region of an instrument cluster or in the region of the dashboard, in the vicinity of the windscreen. By means of image processing algorithms, an image recorded by the camera is searched for typical features, for example two round eyes, an oblong nose, and a horizontal mouth. By evaluating the symmetry properties of these features, a simple identification of the head orientation can already be accomplished; an improved embodiment envisages that the pupils of the eyes are also located and evaluated. For adequate detectability of the scene in the dark, an infrared camera and active infrared illumination of the upper part of the driver's body from the front are used. This detection of the viewing direction or head orientation is used, for example, to determine the driver's attention level with respect to observation of the road. Based on this attention level, driver assistance and/or safety systems are then controlled early or strongly to a varying degree, i.e., operating parameters of these systems are adjusted.

Concrete examples of this are: In collision warning and collision emergency braking systems it is known to set an earlier triggering of the warning or braking process if the driver's gaze is turned away. With ACC-Stop&Go systems and congestion assistance systems, automatic starting is not enabled if the driver's gaze is not directed at the traffic situation. Lateral guidance assistance systems (lane departure warning) warn of inattentiveness far earlier or more strongly than usual. Finally, lane change assistance systems should also be mentioned, which also warn earlier or more strongly if the driver's gaze is not directed at the outside mirror.

DE 10 2015 207 982 A1 discloses a device for detecting the viewing direction of a vehicle user in which an instrument cluster comprises a display and a camera that observes the driver or monitors the driver's viewing direction is arranged in the edge region of the display. By means of this camera, for example, a driver's readiness to take over in the automatic driving mode is monitored or driver tiredness is detected. Vehicle functions may also be controlled as a function of the viewing direction determined. For example, a display screen is made brighter or an indication/region on a display screen is animated as soon as the driver's viewing direction is directed onto it. Furthermore, functions may be controlled by a combination of viewing direction and speech/gestures. Thus, with a glance at a side window of the vehicle and a hand gesture indicating opening, opening of the side window may be achieved.

DE 10 2008 036 023 A1 discloses a vehicle information indicating device, which detects a driver's face using a camera. The camera takes the picture of the face as soon as a seat sensor arranged on the driver's seat determines occupancy.

EP 3 249 497 A1 describes a device with which a display is activated as soon as detection of the driver's gaze is not possible.

From WO 2018208446, a camera for observing a driver is known, wherein light sources arranged above or next to the camera are arranged for display of information and for illumination of objects.

DE 10 2014 221 039 A1 discloses a device for detecting image data of a face with a camera, an image evaluating unit and control equipment for providing a positioning signal, which indicates a direction in which a steering wheel has to be turned, so that the driver's face is not hidden and can be detected with the camera A precondition for safe execution of functions based on determination of eye positions $POS_{A1}$, $POS_{A2}$ of the respective vehicle user or on detection of a viewing direction of the vehicle user is that a camera can determine the eye positions $POS_{A1}$, $POS_{A2}$ of the vehicle user as continuously and disturbance-free as possible (i.e., in particular, without hiding the eyes by objects arranged in the region between the camera and the eyes).

Disturbances in determination of the eye positions $POS_{A1}$, $POS_{A2}$ of the vehicle user, in particular of the driver, may, for example, occur, if depending on his or her seat position, the vehicle user's eyes are hidden by the steering-wheel rim.

Exemplary embodiments of the invention are directed to an improved device for determining a vehicle user's eye positions and/or viewing direction in a vehicle, so that disturbances can be reduced as far as possible.

A first aspect of the invention relates to a device for determining image data of the eyes, eye positions of a vehicle user and/or a current viewing direction of the vehicle user in a vehicle. The proposed device comprises: a camera, with which image data of a vehicle interior are detectable, an image data evaluating unit, with which, based on the captured image data of the eyes, positions $POS_{A1}$, $POS_{A2}$ of the eyes A1, A2 and/or the vehicle user's current viewing direction can be determined, and control equipment, which, if no image data of the eyes, no current positions $POS_{A1}$, $POS_{A2}$ of the eyes A1, A2, and/or no viewing direction is/are determinable, generates a signal S, which activates a light source.

The device according to the invention is characterized in that the light source has one or more individual light sources, wherein the one or more individual light sources are arranged and configured so that the one light source or all individual light sources can only be recognized by the vehicle user when his eyes A1, A2, the eye positions, and/or a viewing direction are clearly detectable by the camera and/or when his eyes are located in a specified optimum spatial region or angular region relative to the camera, i.e., within the sensing range of the camera. In other words, the vehicle user can ensure detection of the image data of the eyes A1, A2, the positions $POS_{A1}$, $POS_{A2}$ of the eyes A1, A2, and/or the current viewing direction by adjusting the seat or steering wheel in such a way that the light source, i.e., either the individual light source or all individual light sources are visible without obstruction. Such an arrangement of the light source or several individual light sources advantageously creates an integral display element that shows the user that the camera cannot capture image data of the eyes, positions $POS_{A1}$, $POS_{A2}$ of the eyes A1, A2, and/or the current viewing direction, and at the same time the user is given an orientation for intuitive operation, i.e., adjustment of the seat, seat position and steering wheel enabling detection by the camera and the use of the assistance systems that are dependent on the camera data.

Here, the term "of the vehicle user" comprises a driver or a front-seat passenger or a passenger in the vehicle.

Here, "A1" denotes, for example, the left eye and correspondingly "A2" denotes the right eye of the vehicle user.

Here, the term "camera" denotes, in particular, a digital camera, a video camera, an infrared camera, or a stereo camera, which in each case record image data and transmit it to the image data evaluating unit. The camera is advantageously sensitive to visible light and advantageously to infrared light. The latter serves, in particular, for determining the positions of the pupils of the vehicle user's eyes A1, A2 and for detecting the positions of the eyes in dark surroundings, for example at night. The camera is directed at the vehicle interior occupied by a vehicle user or a vehicle operator.

The image evaluating unit is configured for extracting image data of the eyes from the camera image data, i.e., for recognizing the vehicle user's eyes from the total image data of the camera.

The positions $POS_{A1}$, $POS_{A2}$ of the eyes A1, A2 in particular denote positions in a fixed vehicle coordinate system. In order to draw conclusions about the positions $POS_{A1}$, $POS_{A2}$ of the eyes A1, A2 in the fixed vehicle coordinate system from positions of the eyes determined in the image data and in particular to determine a viewing direction, corresponding transformations and, if necessary, calibrations are required. A corresponding evaluation algorithm with corresponding transformation parameters is advantageously stored in the image data evaluating unit.

Furthermore, the image data evaluating unit is configured and arranged for determining a current viewing direction of the vehicle user. This takes place based on the image data detected and evaluation algorithms known in the prior art. Details of this are available from the relevant prior art.

In an advantageous variant of the device, the light source is an LED, an OLED, an incandescent lamp, a halogen lamp, a laser, or a Nernst lamp. The light source is arranged at a suitable position in the vehicle.

Advantageously, the light source has a diaphragm or a diaphragm device, which restrict the light rays emanating from the light source to a predetermined solid angle. In this way, the light source with diaphragm/diaphragm device can only be perceived by an eye that is located at the predetermined solid angle.

In an advantageous variant, the light source comprises one or more pixels of a display connected to the control equipment. The light source is advantageously configured as a part of the display. The display is advantageously a display of an instrument cluster for the vehicle. The display is advantageously an LED, OLED, plasma, or LC display. Advantageously, the camera is integrated in the display. Preferably, for receiving the camera, the display has a recess that interrupts the overall contour, so that the camera is arranged within the external contour of the display.

An advantageous variant is characterized in that, if a signal S is generated, the control equipment controls the display to output optical information, and wherein the information instructs the vehicle user to adjust his seat position and/or the steering wheel positioning so that the positions $POS_{A1}$, $POS_{A2}$ of the eyes A1, A2 allow an unobstructed view of the light source. The optical information displayed for this purpose is advantageously represented by a displayed text and/or by at least one corresponding symbol or graphic. The light source and the optically displayed information are advantageously indicated on a display. In an alternative embodiment these may be produced with different elements.

An advantageous variant of the proposed device is characterized in that the device additionally has an audio output unit connected to the control equipment, wherein, if a signal S is generated, the control equipment controls the audio output unit to output acoustic information, and wherein the information instructs the vehicle user to adjust his seat position and/or the steering wheel positioning so that the positions $POS_{A1}$, $POS_{A2}$ of the eyes A1, A2 make an unobstructed view of the light source possible. The acoustic information may be for example a warning signal and/or a spoken text.

In an advantageous variant of the proposed device, the control equipment is configured and arranged for predicting, if a signal S is generated and based on the image data of the vehicle user's, the current eye positions of the vehicle user (i.e., estimating based on a mathematical model), and furthermore, based on the predicted eye positions, to generate data that show how (i.e., downwards/upwards, forwards/backwards) the current seat position and/or the current steering wheel position should be adjusted so that the eyes A1, A2 have an unobstructed view of the camera, or are located in an optimum spatial region. The corresponding information for this is advantageously emitted optically and/or acoustically.

An advantageous variant of the proposed device is characterized in that the device additionally has a seat sensor, with which occupancy of a vehicle seat by the vehicle user is determinable. Advantageously, the device is only activated if the seat sensor determines the occupancy of the vehicle seat. This serves, in particular, for energy saving, and prolongs the life of the corresponding components. Furthermore, in the event that the driver has left his driver's seat, but the vehicle is still occupied by passengers and the device is energized, unnecessary and irritating optical and acoustic outputs are avoided. In an advantageous variant, individual light sources of the light source are in each case provided with a diaphragm device, which restricts light rays emanating from the respective individual light source to particular predetermined solid-angle regions. Alternatively, or additionally to the diaphragm device, the individual light sources are combined with corresponding optics, which restrict the light rays emanating from the respective individual light sources to a particular predetermined solid-angle region.

The predetermined solid-angle regions of the individual light sources overlap advantageously in a spatial region. Advantageously, it is only in this spatial region that the eyes A1, A2 can discern all individual light sources simultaneously. Provided the vehicle user's eyes A1, A2 are located in this spatial region, there is optimum detectability of the eyes by the camera, i.e., in this spatial region, in particular the eyes are not hidden by, for example, the steering-wheel rim of the steering wheel of the vehicle.

Thus, through activation of the light source or of the individual light sources, the vehicle user is first informed that his eyes are not recognizable; the position of his eyes and/or his viewing direction are not currently determinable. Furthermore, the vehicle user is encouraged to alter his seat position and/or the steering wheel position so that he discerns the light source or all individual light sources simultaneously. If this is the case, the vehicle user has optimum adjustment of his relative position to the camera. This is important, in particular, for the reliability and functionality of all functions of the vehicle that depend on determination of the eye positions and/or the viewing direction of the vehicle user.

Advantageously, a first individual light source is arranged on the left, a second individual light source on the right and/or a third individual light source above and/or a fourth individual light source below the camera. Through this arrangement of the individual light sources, in particular simple and intuitive instructions are generated for adjustment at least of the seat position or for adopting a correct sitting position on the seat. If the vehicle user cannot see all, for example the first, second, and fourth individual light sources, this is an indication to change the seat adjustment so that the head and therefore the eyes must be moved vertically upwards, so as to see the third individual light source as well. Alternatively, or additionally, the steering wheel position may be adjusted so that all four individual light sources are discernible by the vehicle user simultaneously. In alternative embodiments, only the first and second or the first, second and third individual light sources are present. Alternatively, in each case several first, second, third and/or fourth individual light sources are arranged adjacent to the camera.

The light source and/or the individual light sources are arranged in such a way that a potential obstruction of the camera caused by the steering wheel and control elements in relation to the user's eyes, restricts view of the user on the light source or the individual light sources depending on the seat setting and body dimensions of a user. The light source is preferably arranged in such a way that it is only partially covered by the steering wheel, so that the user can recognize activation of the light source in any case but can also make settings so that the entire light source lies completely within the user's field of vision and thus complete unobstructed image data acquisition of the eyes, eye positions of a vehicle user and/or a current line of sight of the vehicle user is enabled. The arrangement of the light source or the individual light sources in relation to the camera is therefore dependent on the geometric relationships between driver dimensions, steering wheel, and seat adjustment, whereby the light source or the individual light sources can thus be arranged adjacent to the camera or also spaced apart. The arrangement ensures that regardless of the user and his setting of the seat and steering wheel, the light source or several individual light sources are at least partially covered as soon as the camera does not sufficiently detect required image data of the eyes or any required current positions $POS_{A1}$, $POS_{A2}$ of the eyes A1, A2 and/or required line of sight for the function of assistance systems due to at least partial obscuration by the steering wheel.

An advantageous variant of the proposed device is characterized in that the control unit is configured and arranged so that if the eyes A1, A2 are not detectable by the camera, i.e., the eyes cannot be determined in the generated image data, vehicle functions that are dependent on detection of the eye positions $POS_{A1}$, $POS_{A2}$ and/or determination of the current viewing direction are switched off and a warning is given to the vehicle user. The warning is advantageously a warning that is emitted optically and/or acoustically.

If the vehicle user's eyes are detected by the camera and, based on the image data, the vehicle user's eye positions $POS_{A1}$, $POS_{A2}$ or a current viewing direction can be determined, then advantageously a signal S is not generated and therefore the light source is not activated.

Reliable determination of eye positions and/or current viewing directions of vehicle users is therefore made possible by the proposed device. The proposed device may be regarded as an advanced driver-assistance system. In the case of objects that are located between the camera and the eyes and therefore prevent recognition of the eyes in the image data, it generates at least an optical warning by activating the light source. Through activation of the light source, it is possible for the vehicle user to carry out optimum setting of the seat position adjustment or of the steering wheel position, so that determination of the vehicle user's eye positions and/or viewing direction can take place free of disturbance.

A further aspect of the invention relates to a vehicle with a device as described above.

An advantageous variant of the proposed vehicle is characterized in that the vehicle has an advanced driver-assistance system with at least one function that is dependent on the image data of the eyes, the determined positions $POS_{A1}$, $POS_{A2}$ of the eyes A1, A2, and/or a viewing direction of the vehicle user. This function is advantageously switched off if a signal S is generated, wherein in this case a warning is emitted that is perceptible optically and/or acoustically and/or haptically for the vehicle user, which informs the vehicle user that the respective function is no longer available due to the fact that the vehicle user's eye positions and/or viewing direction is/are not currently determinable.

A further aspect of the invention relates to a method for determining a position of eyes and/or a viewing direction of a vehicle user in a vehicle and a method for operating a device as described above.

The proposed method comprises the following steps. In a first step, a camera detects image data of a vehicle interior. In a second step, based on the image data detected, an image data evaluating unit determines the image data of the eyes, the positions $POS_{A1}$, $POS_{A2}$ of the eyes A1, A2, and/or the current viewing direction of the vehicle user. In a third step, if current positions $POS_{A1}$, $POS_{A2}$ of the eyes A1, A2 and/or the viewing direction of the vehicle user cannot be determined, control equipment generates a signal S, which activates a light source.

An advantageous variant of the proposed method is characterized in that if a signal S is generated and therefore the light source is activated, additionally a display is controlled to output optical information, wherein the information instructs the vehicle user to adjust his seat position and/or the steering wheel positioning so that the positions $POS_{A1}$, $POS_{A2}$ of the eyes A1, A2 allow an unobstructed view of the light source.

An advantageous variant of the proposed method is characterized in that if a signal S is generated and therefore the light source is activated, an audio output unit is controlled to output acoustic information, and wherein the information instructs the vehicle user to adjust his seat position and/or the steering wheel positioning so that the positions $POS_{A1}$, $POS_{A2}$ of the eyes A1, A2 allow an unobstructed view of the light source.

Advantages and advantageous variants of the proposed method are produced by analogous and corresponding application of the details presented of the proposed device.

Further advantages, features and details follow from the description given hereunder, in which—referring to the drawings as necessary—at least one embodiment example is described in detail. Identical, similar and/or functionally similar parts are designated with the same reference symbol.

BRIEF DESCRIPTION OF THE DRAWING FIGURES

Figure 2:
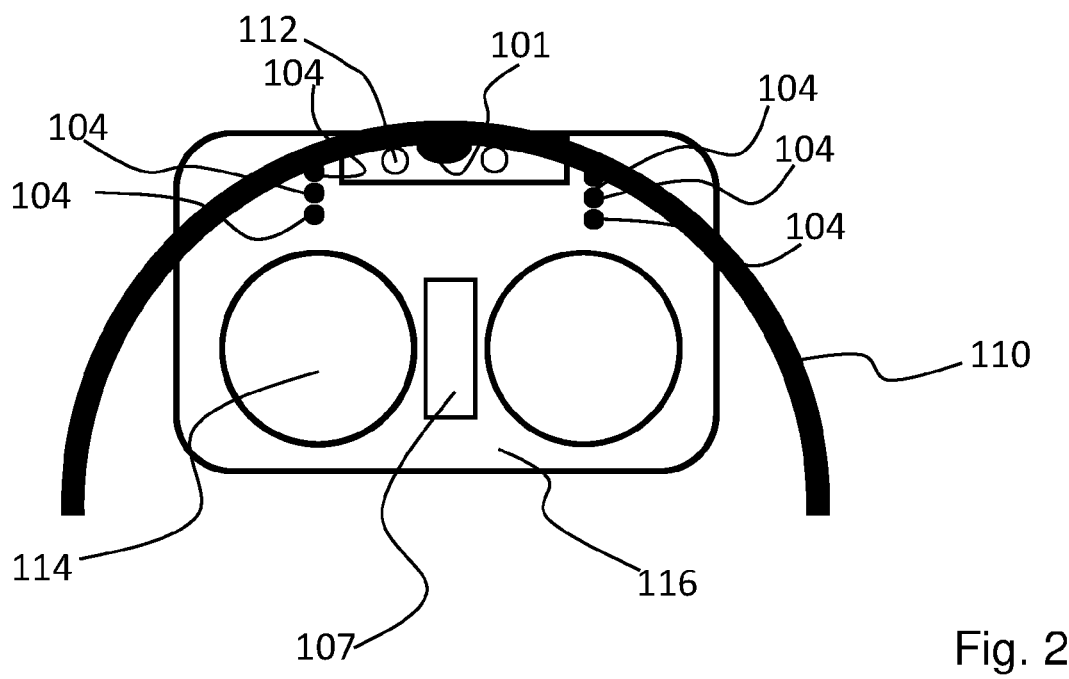

The figures show:

FIG. 1 a highly schematic structure of a proposed device,

FIG. 2 a schematic view of a cockpit with a device according to FIG. 1 and

Figure 3:
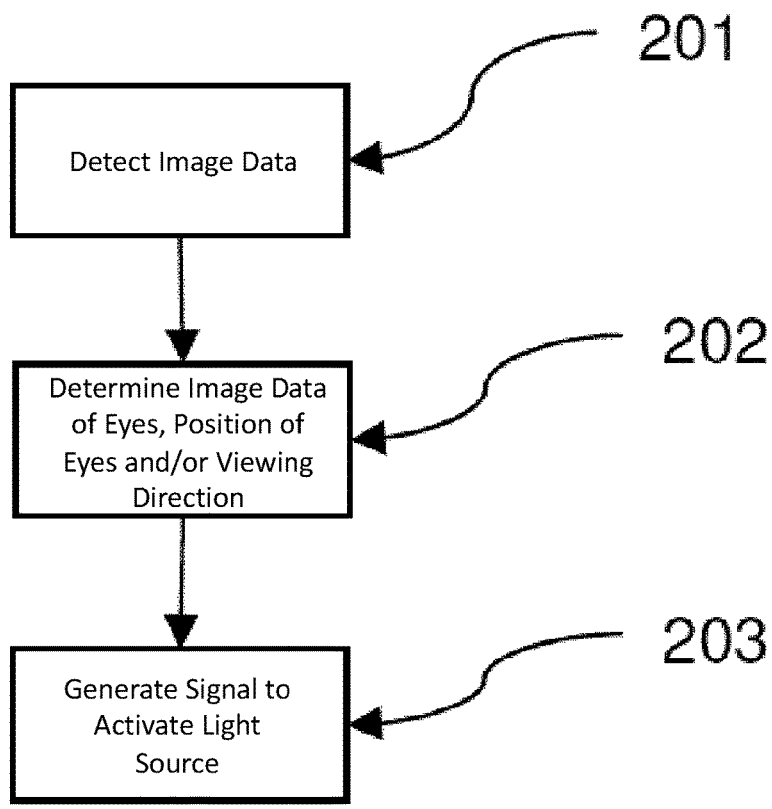

FIG. 3 a highly schematic flow chart of a proposed method.

DETAILED DESCRIPTION

FIG. 1 shows a highly schematic structure of a proposed device 100 for determining a vehicle user's eye positions and/or a current viewing direction of the vehicle user in a vehicle. In this embodiment example, the device 100 comprises a 4K video camera 101, with which image data of a vehicle interior, i.e., a head and eyes A1, A2 102 of the vehicle user are detectable, an image data evaluating unit 103, with which, based on the image data detected, image data of the eyes, positions $POS_{A1}$, $POS_{A2}$ of the eyes A1, A2 102, and/or the current viewing direction of the vehicle user can be determined, and control equipment 106, which, if no image data of the eyes, no current positions $POS_{A1}$, $POS_{A2}$ of the eyes A1, A2, and/or no viewing direction is/are determinable, generates a signal S, which activates a light source 104.

For simplicity, FIG. 1 shows three different vertical positions $POS_{A1}'$, $POS_{A1}''$, $POS_{A1}'''$ only for the left eye A1 102 of a vehicle user relative to the camera 101. The light source 104 has three individual light sources 104 arranged vertically above one another, which are shown as black circles. A sensing range of the camera 101 is marked by continuous lines starting from the camera. In the vertically uppermost position $POS_{A1}'$, the simultaneous view of the left eye A1 102 on all three individual light sources 104 arranged vertically above one another is blocked by a steering-wheel rim 110, which is shown in circular cross-section. From this uppermost position $POS_{A1}'$, in particular, the vertically uppermost individual light source 104 is not discernible for the vehicle user. Thus, conversely, the left eye A1 102 in the $POS_{A1}'$ is not discernible for the 4K video camera 101.

In this example, if the vehicle user's eyes A1, A2 102 are located in a vertical position corresponding to $POS_{A1}'$, the image data evaluating unit 103 is not able, based on the image data, to recognize the vehicle user's eyes, and determine positions $POS_{A1}$, $POS_{A2}$ of the eyes A1, A2 102 and/or the current viewing direction of the vehicle user, so that the control unit 106 generates a signal S, which activates all individual light sources 104 of the device 100. The vehicle user is encouraged thereby to alter his seat position or the steering wheel position so that he has an unobstructed view of all individual light sources 104.

Furthermore, the control unit is connected to a display 107 for output of optical information. As soon as the control unit 106 generates the signal S, this controls the display 107 for output of optical information, wherein the optical information instructs the vehicle user to adjust his seat position and/or the steering wheel positioning so that the positions $POS_{A1}$, $POS_{A2}$ of the eyes A1, A2 allow an unobstructed view of the light source. The optical information is preferably a graphic and/or text instructions.

FIG. 2 shows a corresponding arrangement from a driver's perspective according to the principle in FIG. 1. Identical components are indicated with the same reference symbol as in FIG. 1. The driver's gaze is directed on a full area display 116, which comprises round gauges 114, a display area 107 and a display region for showing individual light sources 104 arranged on the left and right of the camera 101. Light sources 112, for example infrared light sources, illuminating the interior are arranged next to the camera 101. The camera 101 and the light sources are arranged in a recess of the display 116. Corresponding to the situation in FIG. 1, the camera 101 is hidden by the steering-wheel rim 110, so that the vehicle user's eyes A1, A2 are not clearly recognizable by the camera 101. Accordingly, the individual light sources 104 are activated. For unrestricted recognition of the eyes A1, A2, the vehicle user has to adjust his seat or the steering wheel so that all individual light sources are visible. Corresponding instructions are indicated on the display area 107.

FIG. 3 shows a highly schematic flow chart of a proposed method for determining a vehicle user's eye positions and/or a current viewing direction of the vehicle user in a vehicle, with the following steps.

In a first step 201, a camera 101 detects image data of the vehicle interior. In a second step 202, on the basis of the image data detected, an image data evaluating unit 103 determines the image data of the eyes A1, A2, determines the positions $POS_{A1}$, $POS_{A2}$ of the eyes A1, A2, and/or the viewing direction of the vehicle user. If the image data of the eyes A1, A2, positions $POS_{A1}$, $POS_{A2}$ of the eyes A1, A2 and/or the current viewing direction of the vehicle user are not or are only insufficiently determinable, in a third step 203, generation 203 of a signal S by control equipment 106 takes place, which activates a light source 104.

Although the invention has been explained and illustrated in detail with preferred embodiment examples, the invention is not limited by the examples disclosed, and other variations can be derived therefrom by a person skilled in the art, while remaining within the scope of protection of the invention. It is therefore clear that numerous possible variations exist. It is also clear that the exemplified embodiments really only represent examples, which are not in any way to be construed as any limitation of the scope of protection, of the possible uses or of the configuration of the invention. Rather, the preceding description and the description of the figures make a person skilled in the art able to apply the example embodiments concretely, wherein a person skilled in the art, with knowledge of the idea of the disclosed invention, can make various changes, for example with respect to the function or the arrangement of individual elements presented as an embodiment example, while remaining within the scope of protection, which is defined by the claims and legal equivalents thereof, such as more extensive explanations in the description.

The invention claimed is:

1. A method in a vehicle, the method comprising:
  capturing, by a camera in the vehicle, a vehicle user in a first image;
  determining, by an image data evaluating unit, whether the vehicle user's eye positions or current viewing direction are determinable in the first image;
  activating at least two individual light sources when the vehicle user's eye positions or current viewing direction is not determinable in the first image, wherein the at least two individual light sources and the camera are arranged relative each other in the vehicle and relative to the steering wheel in the vehicle so that the steering wheel obstructs the vehicle user's view of the at least two individual light sources when the vehicle user's eyes, eye positions, or current viewing direction are not detectable by the camera;

deactivating functions of the vehicle dependent on detection of the vehicle user's eyes when the at least two individual light sources are activated;

capturing, by the camera, a second image including the vehicle user;

determining, by the image data evaluating unit, whether the vehicle user's eye positions or current viewing direction are determinable in the second image; and deactivating the at least two individual light sources when the vehicle user's eye positions or current viewing direction is determinable in the second image.

2. The method of claim 1, wherein the camera and the at least two individual light sources are integrated in an instrument cluster of the vehicle.

3. The method of claim 1, wherein each of the at least two individual light sources include a diaphragm or optics configured to restrict light rays emanating from a respective one the at least two individual light sources to a predetermined angle.

4. The method of claim 1, wherein the at least two individual light sources consist of two individual light sources, each of the two individual light sources is a pixel on a display in the vehicle.

5. The method of claim 1, further comprising:
outputting, by a display of the vehicle when the at least two individual light sources are activated, information instructing the vehicle user to adjust a vehicle seat or the steering wheel.

6. The method of claim 1, further comprising:
outputting, by an audio output unit of the vehicle when the at least two individual light sources are activated, information instructing the vehicle user to adjust a vehicle seat or the steering wheel.

7. A vehicle, comprising:
a steering wheel;
at least two individual light sources;
a camera, wherein the at least two individual light sources and the camera are arranged relative each other in the vehicle and relative to the steering wheel in the vehicle so that the steering wheel obstructs a vehicle user's view of the at least two individual light sources when the vehicle user's eyes, eye positions, or current viewing direction are not detectable by the camera;
an image data evaluating unit coupled to the camera;
control equipment coupled to the at least two light sources and the image data evaluating unit, wherein
the camera is configured to capture the vehicle user in a first image,
the image data evaluating unit is configured to determine whether the vehicle user's eye positions or current viewing direction are determinable in the first image,
the control equipment is configured to activate the at least two individual light sources when the vehicle user's eye positions or current viewing direction is not determinable in the first image,
functions of the vehicle are deactivated dependent on detection of the vehicle user's eyes when the at least two individual light sources are activated,
the camera is configured to capture a second image including the vehicle user,
the image data evaluating unit is configured to determine whether the vehicle user's eye positions or current viewing direction are determinable in the second image, and
the control unit is configured to deactivate the at least two individual light sources when the vehicle user's eye positions or current viewing direction is determinable in the second image.

8. The vehicle of claim 7, wherein the at least two individual light sources comprise a first individual light source arranged left of the camera, a second individual light source arranged right of the camera, a third individual light source arranged above the camera, and a fourth individual light source arranged below the camera, and wherein respective delimited emission regions of the first, second, third, and fourth individual light sources only partially overlap.

9. The vehicle of claim 7, wherein the control unit is configured, responsive to the vehicle user's eyes not being detectable by the camera, to switch off vehicle functions dependent on detection of the vehicle user's eyes and output warning to the vehicle user.

10. The vehicle of claim 7, wherein each of the at least two individual light sources include a diaphragm or optics configured to restrict light rays emanating from a respective one the at least two individual light sources to a predetermined angle.

11. The vehicle of claim 7, wherein the at least two individual light sources consist of two individual light sources, each of the two individual light sources is a pixel on a display in the vehicle.

12. The vehicle of claim 7, further comprising:
a display configured to output, when the at least two individual light sources are activated, information instructing the vehicle user to adjust a vehicle seat or the steering wheel.

13. The vehicle of claim 7, further comprising:
an audio output unit configured to output, when the at least two individual light sources are activated, information instructing the vehicle user to adjust a vehicle seat or the steering wheel.

* * * * *